United States Patent [19]
Davies-Ross

[11] Patent Number: 6,101,980
[45] Date of Patent: Aug. 15, 2000

[54] COMBINATION COLLAR

[76] Inventor: Jennifer Lynn Davies-Ross, 1543 E. Woodglen, Sandy, Utah 84092

[21] Appl. No.: 09/368,533

[22] Filed: Aug. 5, 1999

Related U.S. Application Data

[60] Provisional application No. 60/095,636, Aug. 7, 1998.
[51] Int. Cl.[7] .................................................. A01K 29/00
[52] U.S. Cl. .......................................................... 119/856
[58] Field of Search .................................... 119/792, 795, 119/856, 769, 712, 718, 719, 720

[56] References Cited

U.S. PATENT DOCUMENTS

| | | | |
|---|---|---|---|
| 4,947,795 | 8/1990 | Farkas | 119/718 |
| 5,353,744 | 10/1994 | Custer | 119/719 |
| 5,815,077 | 9/1998 | Christiansen | 119/712 X |

*Primary Examiner*—Thomas Price

[57] ABSTRACT

The Combination Collar is worn around the neck of a dog [or other animal] that one desires to control with the use of a leash attached to the collar. The collar being of a design such that the surface geometry of the inner surface of the collar, [surface of the collar facing the neck of the animal] having a plurality of posts or protruding elements that are substantially surrounded by a compressible, resilient material that, temporarily changes from a surface that is generally smooth, to a surface having protruding pressure points. This temporary change in surface geometry occurs in direct response to tension between the leash and the collar, as when the animal attempts to pull away from the attached leash. The inner surface of the collar returns to its original [generally smooth] surface geometry when the tension is absent.

5 Claims, 5 Drawing Sheets

COMBINATION COLLAR

This application claims benefit of Provisional Application 60/095,636 filed Aug. 7, 1998.

CROSS REFERENCES TO RELATED APPLICATIONS

This application references prior patents and prior art as follows:
U.S. Pat. No. 5,815,077 (Erik P. Christiansen, Nov. 20, 1996)
U.S. Pat. No. 5,353,744 (Daniel A. Custer, Jun. 16, 1993)
U.S. Pat. No. 2,394,144 (H. B. Brose, Dec. 14, 1944)
U.S. Pat. No. 1,603,222 (William T. Transue, Dec. 21, 1925)

BACKGROUND OF THE INVENTION

1. Field of the Invention

Currently, there are two primary types of mechanical, non-electronic, animal (dog) training collars, (a) choke chains and (b) pinch collars. The choke chain slips over the dogs head and the leash is attached to a loop at the end of the chain. When the dog pulls, the chain tightens around the dog's neck. A problem with this method of correction is that the dog may not respond to the tightening around the neck, short of near strangulation, and continue to pull. An alternative form of correction collar is the pinch collar. The pinch collar is a string of chain links with prongs on each of the links. When the dog pulls, the collar tightens and prongs press on the dog's neck. Because of the harsh appearance of the collar, this method of correction is sometimes criticized as being inhumane.

Both the choke chain and pinch collar are usually only placed on the dog's neck at the time of the walk or training session. Typically, it is not recommended that these collars be left on the dog throughout the day or at night, as they can get hooked or tangled with a stationary object, trapping the dog. Also, the prongs on the pinch collar tend to get tangled in the hair of longer hair breeds and the prongs can also irritate the dog's neck.

There is a need for a correction collar that offers a gentle reminder to the dog not to pull when on a leash. In addition, there is a need for a correctional device which can be worn all of the time, eliminating the need to constantly put on and take off a special purpose collar.

The "Combination Collar", here in described, can be worn safely and comfortably by the dog at all times. When on a leash, the "Combination Collar" offers a gentle reminder to the dog not to pull, when the dog is restrained by a leash attached to said collar.

2. Description of the Related Art

The closest known animal training collar enables the owner/operator to deliver an electrical shock to the animal as a means of correcting an undesirable behavior. The present state-of-art for training collars is exemplified by assigned U.S. Pat. No. 5,815,077 (Christiansen, Nov. 20, 1996) and assigned U.S. Pat. No. 5,353,744 (Custer, Jun. 16, 1993). Both of these references disclose training collars that permit the owner/operator to deliver an electrical pulse to the neck of the animal. Understanding that electronic control collars are relatively complicated and require ongoing experience and maintenance, including replacement of batteries, there remains a need for control collar that delivers humane, intermittent correction for undesirable behavior without the use of electrical shock.

Other known prior art which operates in a manner as to control and train an animal by forcing prongs against an animal. As exemplified by U.S. Pat. No. 1,603,222 (Transue, Dec. 21, 1925), springs trigger a sudden onset of force against prongs, driving them inward against the animal's neck. As exemplified by U.S. Pat. No. 2,394,144 (Brose, Dec. 14, 1944), the correction is delivered to the animals' neck by prongs which are maintained in an outer non-contacting position. Tension applied to the animal's lead will advance the prongs through holes in the collar and against the animal's neck.

The object of this disclosed invention, the Combination Collar, delivers pressure to the animal's neck through the compression of a soft resilient material. Embedded within the materials, these prongs, provide pressure to the animal's neck when tensions is applied to the lead. Unlike the previously disclosed prior art, this disclosed device, the Combination Collar, does not use electrical shock, does not provide for a sudden triggering of force, and does not provide for the movement of prongs. The components of the Combination Collar remain stationary. The only movement within the device is consistent with the compressing and returning to the original size and shape of the compressible, resilient material comprising the inner lining of the collar and surrounding the prongs.

SUMMARY OF THE INVENTION

The subject collar is worn around the neck of a dog [or other animal] that one desires to control with the use of a leash attached to the collar. The collar being of a design such that the surface geometry of the inner surface of the collar [surface of the collar facing the neck of the animal] temporally changes from a surface that is generally smooth, to a surface having protruding pressure points. This temporary change in surface geometry occurs in direct response to tension between the leash and the collar, as when the animal attempts to pull away from the attached leash. The inner surface of the collar returns to its original [generally smooth] surface geometry when the tension is absent.

The degree of temporary change in the surface geometry of the inner side of the collar [from smooth, to having protruding pressure points] occurs in direct relationship to the amount of tension on the collar [how hard the animal is pulling on the leash]. Thus, the degree of correction, i.e., discomfort felt by the dog, increases the harder the dog pulls against the leash.

The tension on the collar that results in a change in the geometry of the inner surface of the collar need not change [reduce] the circumference of the collar. However, this Combination Collar concept can be incorporated into a collar that also tightens in response to tension. Thus, when the dog pulled on the leash such a collar would both tighten, and the inner surface would also change from generally smooth to having pressure points, as above described.

The Combination Collar may also have a second attachment point for a leash that does not activate the change in inner surface geometry when tension is applied to the leash; i.e. the inner surface of the collar remains generally smooth when tension is applied to the leash.

DETAILED DESCRIPTION OF THE INVENTION

Preferred Embodiments

Figure 1:
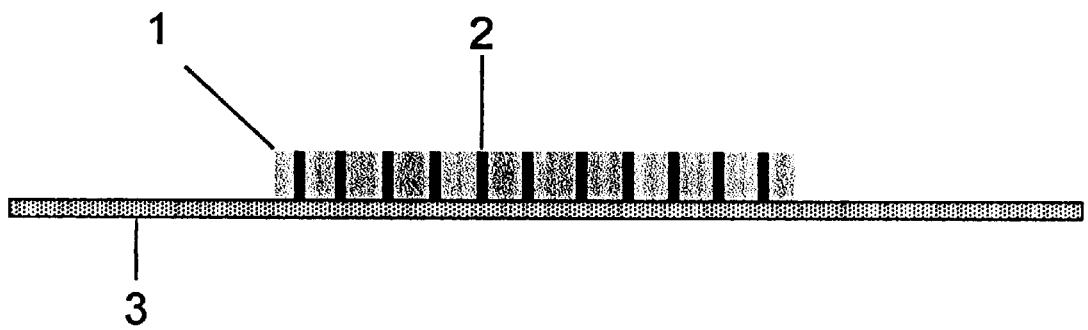
FIG. 1 illustrates the Combination Collar correctional device in a non-correcting position.

FIG. 1 A compressible, resilient material 1, such as foam rubber, is fastened to the inside of a standard non-elastic dog (animal) collar 3. Prongs or posts 2 are located within the compressible, resilient material and secured to the collar or the compressible, resilient material.

Figure 2:
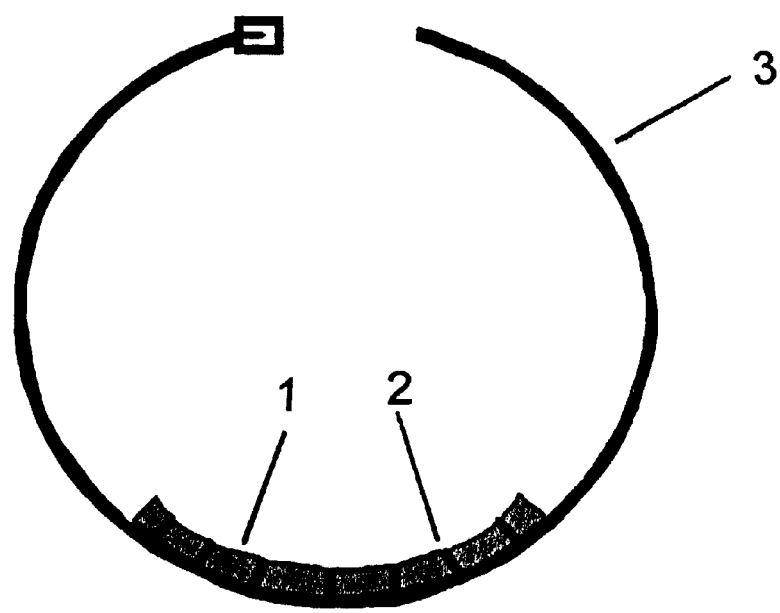
FIG. 2 illustrates the Combination Collar's correctional device attached to the inside of an animal's collar.

FIG. 2 This standard collar 3 (to which the compressible, resilient material is fastened) can be made of traditional, non-elastic animal collar material, such as leather, or Nylon webbing, of common width (0.75 inches–1.0 inches) and appropriate length to be comfortably fastened around the dog's neck.

Figure 3:
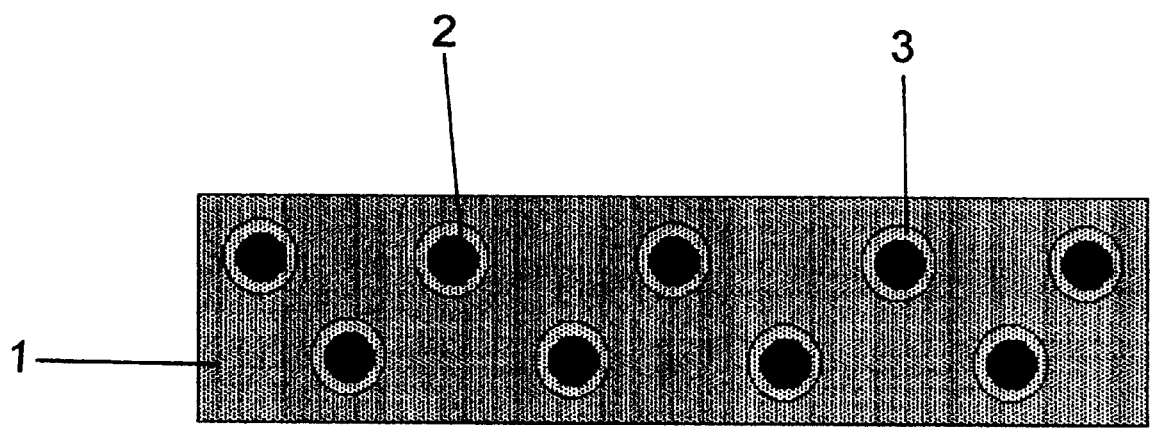
FIG. 3 is an aerial view of the Combination Collar correctional device, depicting the compressible material, holes, and posts.

FIG. 3 Prongs or posts 2 are attached to the collar material or the compressible, resilient material 1, such that they protrude toward the inner side of the collar, into holes 4 that run through the thickness of the compressible, resilient material. These Prongs or posts 2 are made of a generally ridged material such as metal or plastic and may be individual parts or molded as a single unit with multiple posts, or molded as a part of the collar material.

FIG. 2 These Prongs or posts 2 are spaced along at least the mid-length of the collar, such that there is sufficient space at one end of the collar 3 for a buckle 5, and holes 6 on the other end of the collar to engage with the buckle when the collar 3 is put on the dog, or some other suitable mechanism for attachment of the collar around the dog's neck.

FIG. 3 Holes 4 are located through thickness of the compressible, resilient material 1 at the location of each prong, or post 2.

FIG. 3 These holes 4 through the compressible, resilient material 1 are of a diameter that is larger than the diameter of the prong, or post 2, such that the prongs, or posts do not interfere with the compression or return to original shape of the compressible, resilient material.

FIG. 1 This compressible material 1 is substantially equal in thickness, or thicker than the length of the prongs, or posts 2. Such that when the compressible material is not compressed, the prongs, or posts do not substantially protrude beyond the surface of the compressible, resilient material.

FIG. 2 When the dog is not on a leash, or is on a leash and not pulling, the prongs 2 are recessed within the compressible, resilient material 1; therefore, the combination collar has a generally smooth inner surface and is comfortable and safe for the dog to wear at all times.

Figure 4:
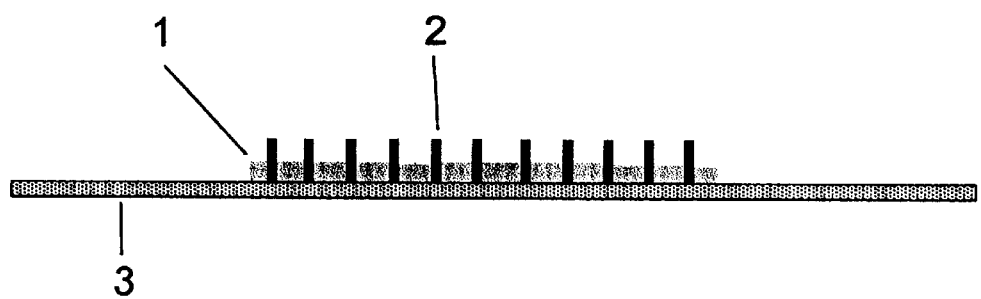
FIG. 4 illustrates the Combination Collar correctional device in a correcting position.
Figure 5:
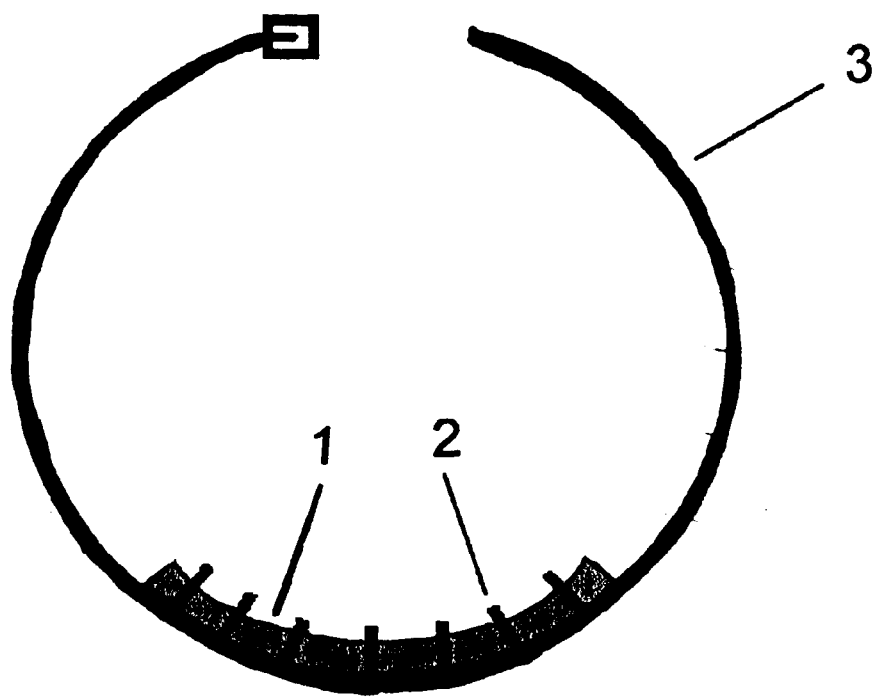
FIG. 5 illustrates the Combination Collar correctional device in a correcting position, attached to the inside of an animal's collar.

FIG. 4 and FIG. 5 When a dog wearing this combination collar is on a leash (leash attached to said collar) and the dog pulls, the compressible, resilient material 1 is compressed between the non-elastic outer collar 3 and the neck of the animal exposing the prongs, or posts 2 on the inner side of the collar. These prongs or posts 2 apply pressure to the dog's neck, causing discomfort and acting as a reminder to the animal not to pull. FIG. 1 and FIG. 2 When the dog stops pulling, the compressible, resilient material 1 returns to its original thickness, which is substantially equal to, or greater than the length of the prongs, or posts 2, rendering the inner surface of said collar once again smooth and without pressure points.

It is understood that within the scope of this design:

The firmness of the compressible, resilient material (or materials, if more than one layer of compressible, resilient material, e.g. foam rubber, is used) can be selected such that a "softer" or harder foam that would compress more or less easily, and allow the dog to feel pressure from the prongs or posts as the result of more or less tension, or pulling.

The outer, non-elastic collar and the prongs, or posts may be molded of a suitable plastic material as one unit, to which the compressible, resilient material is adhered, or otherwise attached Prongs, or posts can be located within holes in a length of compressible, resilient material that is within the width of standard dog collars (0.75 inches and 1.0 inches are the most common widths of collars).

The prongs or posts may be secured to the outside surface of the compressible, resilient material, or than to the outer non-elastic collar material. The point of the prong, or post is inside the hole in the foam, pointed toward the inside of the collar, i.e., pointing toward the neck of the dog.

There may be loops or a tunnel along the outside of the above compressible, resilient material assembly, through which one can thread a standard non-elastic animal collar such that the standard collar now has the added features of the Combination Collar added to the inside surface of the said standard non-elastic collar.

Further, this previously described length of compressible, resilient material incorporating the prongs, or posts and loops or a tunnel, can be cut to length to fit various size said standard non-elastic collars.

In a modification of this collar design, one could add a band of non-elastic material on top of the compressible, resilient material, i.e., the side facing the animal's neck. This variation allows the alternate attachment of the leash to this non-elastic inner collar material. When a leash is attached in this manner the animal's pulling (tension on the leash) does not result in compression of the compressible, resilient material, nor the creation of pressure points on the inner side of said collar. Connecting the leash to said standard non-elastic outer collar will result in compression of the compressible, resilient material between the standard non-elastic outer collar and the animal's neck, and the creation of pressure points when the animal puts tension on the leash by pulling away, as explained above.

What is claimed is:

1. An animal collar comprised of a length of non-elastic that encircles the neck of an animal, or can be buckled or otherwise fastened around the neck of an animal:

b) said length of non-elastic material incorporating an attached loop, ring or other point to attach a leash or lead can be attached;

c) said length of non-elastic material having a plurality of posts or protruding elements such that the said elements protrude toward the inner side of said length of non-elastic material, i.e., toward the neck of the animal;

d) said length of non-elastic material also having attached to its inner side compressible, resilient material where the uncompressed thickness of said compressible, resilient material is substantially equal to or greater in its thickness than the length of said protruding elements, to be attached to said length of the non elastic material and said compressible, resilient material substantially surrounds the protruding elements;

e) said compressible, resilient material having holes or openings through its thickness in the location of each of the said protruding elements, such holes being of a size and shape such that the protruding elements do not interfere with the compression or return to original thickness of said compressible, resilient material.

2. An animal collar as described in claim 1 where said protruding elements are secured to said compressible, resilient material, rather than to the length of non-elastic material.

3. An animal collar as described in claim 1 or claim 2 where there are loops or a tunnel along the length of the outside of the collar assembly, such that one can thread a standard animal collar through said loops or tunnels, such that the standard collar has the added feature of the subject control device.

4. An animal collar as described in claim 1 or claim 2, that adds a length of non-elastic material on top of said compressible material between the compressible material and the neck of the animal such that when a leash or lead is attached to a point on said non-elastic length of material, pulling of the animal on the leash or lead does not result in compression of said compressible, resilient material.

5. An animal collar described in claim 1 or claim 2 where said compressible, resilient portion is comprised of more than one layer of material, such that the different layers may be selected to have different resistances to compression.

* * * * *